United States Patent [19]

Croome

[11] 4,082,857
[45] Apr. 4, 1978

[54] GELATIN COMPOSITION

[75] Inventor: Ronald John Croome, Cardiff, Wales

[73] Assignee: P. Leiner & Sons Limited, Treforest, Wales

[21] Appl. No.: 733,033

[22] Filed: Oct. 18, 1976

[30] Foreign Application Priority Data

Oct. 21, 1975 United Kingdom .............. 43212/75

[51] Int. Cl.$^2$ ............................ A23L 1/06; A23L 1/04
[52] U.S. Cl. .................................. 426/573; 426/575; 426/576
[58] Field of Search ................... 426/573, 576, 575

[56] References Cited

U.S. PATENT DOCUMENTS

| 2,838,402 | 6/1958 | Steigmann et al. | 426/576 |
| 3,108,995 | 10/1963 | Tourtellotte et al. | 426/576 |
| 3,763,138 | 10/1973 | Rakoczy et al. | 426/576 |
| 3,917,875 | 11/1975 | Gardiner | 426/576 |

FOREIGN PATENT DOCUMENTS 1,072,768  6/1967  United Kingdom ................ 426/576

Primary Examiner—Jeanette M. Hunter
Attorney, Agent, or Firm—Blanchard, Flynn, Thiel, Boutell & Tanis

[57] ABSTRACT

The invention concerns gels and gelling systems of a polysaccharide and a chemically modified gelatin, preferably an acylated gelatin, whose isoelectric point is below the pH of the gel, e.g. below pH 4. Such systems overcome the problem of incompatibility between gelatin and polysaccharide at the low pH values commonly encountered in jelly desserts and confectionery due to the presence of fruit acids such as citric acid.

15 Claims, No Drawings

GELATIN COMPOSITION

This invention relates to gelled and gellable products, especially but not exclusively gelatin desserts and confectionery, having as their gelling agent a combined gelatin and polysaccharide system.

Gelatin jelly-like desserts and confectionery are usually prepared at pH values within the range of 3.5 to 4.0, achieved by the incorporation of polybasic organic acids, e.g. citric acid, to provide the tartness of the desired fruit flavour.

Many attempts have been made to effect a partial replacement of gelatin, in such systems, by polysaccharide gelling agents such as carragheenins, pectins, agar-agar, etc. These, however, generally result in a severe loss of clarity of the product or even in a loss of gelling capacity through precipitation of the protein-polysaccharide complex, the gelatin being incompatible with the polysaccharides under these conditions.

The iso-electric pH of gelatin can be markedly reduced by well-known chemical modification procedures. The modified gelatin can be one chemically modified by reaction at the amino group sites, provided by the constituent amino acids lysine and hydroxylysine, so that the pH value at which the modified gelatin is isoelectric is reduced e.g. to within the pH range (pH 3.5 to 4.0) normally obtained in gelatin dessert products and confectionery and resulting from the addition of "fruit" acids such as citric acid. One such modification involves reaction of the gelatin with the anhydrides of dicarboxylic acids (e.g. succinic anhydride) at a pH approaching the pK value of its basic functional amino groups (pH 8.0 to 10.0) when the basic function of the amino group is replaced by a substituent group carrying a free carboxyl grouping. This results in a marked reduction in the value of the isoelectric pH of the modified gelatin. It is to be understood that the use of gelatins having isoelectric points below the pH obtaining in dessert and confectionery products, typically below pH 4.0, and obtained by various chemical means is embodied within the scope of the invention.

According to one aspect of the invention there is thus used a chemically modified gelatin, preferably one modified by substitution (e.g. acylation) of amino groups thereof, which is compatible with the polysaccharide gelling agent at the pH of the jelly dessert, e.g. at pH 4 or less.

The method of lowering the isoelectric point of the gelatin may thus comprise reacting the gelatin to convert amino groups thereof to, and/or replace amino groups thereof with, groups of greater acidity, e.g. by acylation of amino groups, preferably with a poly- or dicarboxylic acid anhydride such as succinic anhydride; the reaction of the gelatin with the anhydride or other amine-reactive agent is preferably conducted at a pH close to the pK value of the amino groups.

Typically, the chemical modification can be carried out according to the following procedure:

A dispersion of 100 g. of an alkali-processed bone gelatin (pI 4.9) in 1 liter of water is prepared at 50° C. The pH value of the solution is raised to 9.0 by the addition of sodium hydroxide solution when, with constant stirring, 5 g. of finely powdered succinic anhydride are slowly added. During this addition, the pH value of the system is constantly monitored and maintained at pH 9.0 by further additions of sodium hydroxide solution. On completion of the addition of the acid anhydride, the system is maintained at 50° C for 10 minutes, with stirring, and the pH value then reduced to 6.0 by the addition of sulphuric acid. Any suitable acid may be used at this stage, those normally employed being the mineral acids hydrochloric, sulphuric or phosphoric.

The resultant modified gelatin is iso-electric at a pH of 3.6, reaction having occurred at 92% of the available amino-group sites, as evidenced by the relative 'formol' titration values of the parent and the modified gelatins respectively.

Such chemically modified gelatins show improved stability in the presence of polysaccharides gelling agents over that of the unmodified gelatin, when the pH value of the system is reduced to about 4.0 by the addition of fruit acids such as citric acid. There is, however, still a tendency towards instability in the systems, as evidenced by the loss of clarity.

Where modified gelatins are to be employed according to the invention in compositions with polysaccharide gelling agents and poly-basic organic acids such as citric acid, e.g. in desserts and confectionery, the compatibility of the modified gelatin with the polysaccharide at the low pH of the gelled composition is improved by adjusting the pH of the modified gelatin to a lower value by means of a polybasic organic acid, e.g. citric acid.

Modified gelatin/polysaccharide gelling systems according to the invention include those which can set to a gel having a higher rigidity than that provided by gelatin alone; they also include those which may be extended by the incorporation of relatively inexpensive non-gelling components such as starch hydrolysates and yet maintain adequate gelling capacity, similar to that provided by gelatin alone.

Non-gelling components in gelling systems according to the invention may for example constitute up to 40 wt.% of the modified gelatin.

It has been found then that the compatibility of gelatin with polysaccharide gelling agents is improved if the gelatin is chemically modified such that its iso-electric pH is reduced to an extent whereby the modified gelatin remains anionic at the pH value of the dessert or confectionery product, typically below pH 4.0.

Further marked improvement in compatibility is obtained if the reaction pH of the modified gelatin is reduced to a value of 6.0 with a polybasic organic acid such as citric acid. This buffered modified gelatin permits the preparation of dessert and confectionery products of the required degree of tartness at pH values further removed from the pI of the modified gelatin, so providing compatibility with the polysaccharide gelling agents.

The improved rigidity of gelatins produced from mixes of the buffered modified gelatin and polysaccharide gelling agents allows the inclusion in the systems of non-gelling extenders or diluents.

The following are purely illustrative Examples of the invention and its practice:

EXAMPLES 1 TO 5

Gelatin, chemically modified, as described above, by reaction with succinic anhydride has been mixed with a number of different polysaccharide gelling agents in the ratio 4 parts gelatin to 1 part polysaccharide to provide aqueous solutions of concentration 5%.

The polysaccharides employed included phosphate buffered and unbuffered carragheenins, high methoxy and low methoxy grades of pectin, Danish agar and alginate esters. Compatibility of the resultant systems was assessed spectrophotometrically by a measure of the light absorbance of the systems in both the sol and the gel form. A 1 cm. light path was employed at a wavelength of 600 nm.

The improved compatibility of the modified gelatin with the polysaccharide gelling agents over that of systems employing the unmodified parent gelatin is illustrated in TABLE 1 by reference to admixtures of the gelatins with an unbuffered carragheenin(Genugel W.G. obtained from A/S. Kobenhavns Pektin Fabrik), the propylene glycol ester of alginic acid (Manucol Ester E/RK from Alginate Industries Ltd.) and a low-methoxy pectin (from H.P. Bulmer Ltd).

TABLE 1.

| Composition of Mix Example | | pH Value | Light Absorbance (600nm) Sol Form | Gel Form | Bloom Gel Strength | Solution Viscosity (milliposes at 40° C.) |
|---|---|---|---|---|---|---|
| 1. | | | | | | |
| a. | Parent Gelatin × 4) LM Pectin × 1) | 4.0 6.0 | Precipitation 0.180 | 0.342 | — 98 | — 62.5 |
| b. | Modified Gelatin × 4) LM Pectin × 1) | 4.0 6.0 | 0.281 0.184 | 0.276 0.172 | — 151 | — 99.1 |
| 2. | | | | | | |
| a. | Parent Gelatin × 4) Manucol Ester × 1) | 4.0 6.0 | Precipitation 0.324 | 0.424 | — 96 | — 98.4 |
| b. | Modified Gelatin × 4) Manucol Ester × 1) | 4.0 6.0 | 0.410 0.397 | 0.398 0.364 | — 159 | — 127.8 |
| 3. | | | | | | |
| a. | Parent Gelatin × 4) Genugel WG × 1) | 4.0 6.0 | 0.826 0.914 | 0.812 0.908 | — 200 | — 124.2 |
| b. | Modified Gelatin × 4) Genugel WG × 1) | 4.0 6.0 | 0.153 0.010 | 0.150 0.008 | — 355 | — 261.8 |
| 4. | | | | | | |
| | Parent Gelatin | 4.0 6.0 | 0.050 0.035 | 0.063 0.030 | — 207 | — 70.5 |
| 5. | | | | | | |
| | Modified Gelatin | 4.0 6.0 | 0.037 0.024 | 0.034 0.016 | — 206 | — 69.8 |

The modified gelatin - carragheenin (Genugel W.G.) - admixture is seen to exhibit a very marked cooperative effect in terms of its physical properties measured at pH 6.0

EXAMPLE 6

If, however, the acylation of the gelatin, as described in Example 1, is followed by pH adjustment with a polybasic organic acid, such as citric acid, the compatibility of this buffered acylated gelatin with polysaccharides is much improved.

Reduction of the pH value of the acylated gelatin from the reaction value (pH 9.0) to pH 6.0 required 12.5% by weight of the gelatin of citric acid.

The compatibility of this buffered acylated gelatin with the polysaccharides is exemplified by the results obtained with the carragheenin (Genugel WG) in the presence of further quantities of added citric acid and using the following formulation for test purposes - this approximating to the composition of a typical table jelly dessert.

| Buffered Acylated Gelatin | 2.0 | g. |
|---|---|---|
| Carragheenin | 0.5 | g. |
| Sugar | 12.5 | g. |
| Water to | 100 | g. |

The results obtained, expressed as absorption values per cm. light path at a wavelength of 600 n.m. are reported in Table 2.

TABLE 2.

| Test No. | Additional Citric Acid (% of Gelling Agent) | pH Value. | Absorption (cm at 600 nm) |
|---|---|---|---|
| 1 | Nil | 5,90 | 0.048 |
| 2 | 1.0 | 5.35 | 0.028 |
| 3 | 3.0 | 4.80 | 0.026 |
| 4 | 5.0 | 4.45 | 0.226 |

It will be seen that this system tolerates the addition of a further 3% of citric acid by weight on the combined gelling agents (so making a total of 15.5% on this basis) to arrive at a pH of 4.8. This content of citric acid readily imparts a pronounced tartness of flavour to the prepared dessert and the replacement of 20% of the gelatin by a polysaccharide gelling agent does not appear to alter the texture of the prepared dessert.

EXAMPLE 7

The influence of variations in the relative concentrations of the buffered modified gelatin, described in Example 6, and the carragheenin (Genugel WG) was examined by a measure of gel rigidity in grams using a Boucher Gelometer with a plunger of one inch diameter, after maturing the systems for 18 hours at 10° C. The clarity of each system was measured by the absorption of light, of wavelength 600 n.m., by a gel of thickness 1 c.m.

The general composition of the system employed was:

| Buffered Acylated Gelatin | X | g. |
|---|---|---|
| Carragheenin (Genugel WG) | Y | g. |
| Citric Acid | 0.075 | g. |
| Sugar | 12.5 | g. |
| Water to | 100 | g. |

Variations of the two gelling components were made as follows:

| Buffered Acylated Gelatin | X | g. |
|---|---|---|
| Carragheenin (Genugel WG) | Y | g. |
| Citric Acid | 0.075 | g. |
| Sugar | 12.5 | g. |
| Water to | 100 | g. |

The gel rigidity values and the light absorption measurements on each of the above systems are recorded in Table 3.

TABLE 3.

| Test No. | Gel Strength (g) 1 | 2 | Absorption at 600 n.m. |
|---|---|---|---|
| a | 228 | 215 | 0.064 |
| b | 200 | 179 | 0.056 |
| c | 164 | 166 | 0.055 |
| d | 144 | 148 | 0.052 |
| e | 159 | 158 | 0.050 |
| f | 177 | 165 | 0.048 |

Contents of Genugel WG in excess of 20% by weight of the total gelling mixture were not examined because of the constraint imposed by the very high resultant solution viscosity which significantly impeded dispersion of the system. Each of the systems, examined above, exhibited good clarity.

EXAMPLE 8

A non-gelling extender can be included in the system to control the physical properties of the resultant mix and to make it less costly than gelatin per se, whilst maintaining the required content of solids. Such extenders may be water soluble modified starches or starch hydrolysates, protein hydrolysates etc. As an example, the following data refer to the incorporation of a low D.E. wheat sugar derived by partial acid hydrolysis of wheat starch and a soya protein hydrolysate (Supro 900 obtained from Ralston Purina Company). The general composition of the system tested was:

| Buffered Acylated Gelatin | X | g. |
|---|---|---|
| Carragheenin (Genugel WG) | Y | g. |
| Extender | Z | g. |
| Citric Acid | 0.075 | g. |
| Sugar | 12.5 | g. |
| Water to | 100 | g. |

Variable compositions were arrived at with the following relative weights in grams of three components of the system.

| TEST NO. | COMPONENT X | Y | Z |
|---|---|---|---|
| a | 2.5 | Nil | Nil |
| b | 2.0 | 0.5 | Nil |
| c | 1.5 | 0.5 | 0.5 |
| d | 1.0 | 0.5 | 1.0 |

The comparative test data, obtained as described above, are recorded in Table 4 for the Starch Hydrolysate.

TABLE 4.

| TEST | GEL STRENGTH (g) 10° C. 1 | 2 | ABSORPTION AT 600 n.m. |
|---|---|---|---|
| a | 132 | 139 | 0.016 |
| b | 228 | — | 0.050 |
| c | 182 | 175 | 0.010 |
| d | 111 | 116 | 0.014 |

System b incorporating 80% of the buffered modified gelatin and 20% Genugel WG as the gelling component again exhibits markedly higher gel rigidity values than the other systems although, in this instance, it appears to suffer a little loss of clarity. System c also shows a considerable increase in rigidity over that containing gelatin alone, and is of very good clarity.

EXAMPLE 9

Table 5 contains data obtained for the compositions of Example 8, but using the protein hydrolysate Supro 900 as the non-gelling extender for the system.

TABLE 5.

| TEST | GEL STRENGTH (g) 10° C. 1 | 2 | ABSORPTION AT 600 n.m. |
|---|---|---|---|
| a | 137 | 137 | 0.080 |
| b | 185 | 178 | 0.052 |
| c | 156 | 146 | 0.172 |

The same comments apply to the above data with respect to gel rigidity and clarity, as to the results noted in Example 8 (Table 4).

EXAMPLE 10

The ability of polysaccharides other than carrageenan to perform satisfactorily in the above systems is exemplified by the inclusion of Danish Agar (furcellaria) as the polysaccharide gelling agent in place of the carragheenin, again incorporating the protein hydrolysate Sypra 900 as the non-gelling extender. Data referring to such systems, assessed on the same basis as that of Tables 4 and 5 respectively, are shown in Table 6.

TABLE 6.

| TEST | GEL STRENGTH (g) 10° C 1 | 2 | ABSORPTION AT 600 n.m. |
|---|---|---|---|
| a | 137 | 137 | 0.050 |
| b | 171 | 180 | 0.032 |
| c | 158 | 162 | 0.116 |

The data of tables 5 and 6 show System b incorporating 80% of the buffered modified gelatin and 20% polysaccharide as the gelling component has a higher gel strength than the other systems examined and is of excellent clarity. In these cases the inclusions of the protein hydrolysate as the extender to the extent of 20% by weight of the total gelling component, occasions a slight loss of clarity but still yields gels of higher rigidity than those obtained using the gelatin as the sole gelling agent. The preferred polysaccharide gelling agents for use with the buffered acylated gelatin of this invention are carragheenin or Danish Agar suitably in a proportion of 20% by weight of total gelling agent plus any diluent or extender. Combined polysaccharide/gelatin compositions according to the invention are suitable for use in the preparation of "jelly crystals".

The present invention thus resides principally in the use of a buffered modified gelatin which is compatible with polysaccharide gelling agents at pH values sufficiently low to impart the required degree of tartness to jelly-like dessert products and confectionery. The invention also provides the polybasic organic fruit acid-buffered modified gelatin, i.e. a mixture of the modified gelatin with the fruit acid such as citric acid; this may be supplied for admixture with a polysaccharide for use in forming gels according to the invention. The fruit acid may for example be present in an amount of up to 20% by weight of the modified gelatin, most preferably up to 15 or 16 wt. % e.g. about 12.5 wt.%.

When, as is preferred, the gelatin is one modified by reaction with a polycarboxylic compound, any excess of the latter which may remain in the modified product is to be distinguished from the added polybasic acid or acids with which the modified gelatin is used. The modifying carboxylic compound is generally succinic acid or a similar acid, preferably in the anhydride or acid halide form, which reacts with amino groups of gelatins; on the other hand, the acids which are added to the modified gelatin in the preparation of the gels or gelling compositions are the polycarboxylic fruit acids, e.g. citric, tartaric, malic and adipic acids, which are conventionally employed in jelly desserts and confectionery; in general these fruit acids do not form anhydrides reactive with the amino groups of gelatin.

I claim:

1. An acidic dessert gel in which the gel-forming ingredients consist essentially of a polysaccharide gelling agent and a chemically modified gelatin gelling agent, the isoelectric point of said chemically modified gelatin gelling agent being below the pH of the gel.

2. A gel according to claim 1 containing a fruit acid.

3. A gel according to claim 1 containing citric acid.

4. A gel according to claim 1 wherein said chemically modified gelatin gelling agent is an acylated gelatin.

5. A gel according to claim 1 wherein said chemically modified gelatin gelling agent is a succinylated gelatin.

6. A gel according to claim 1 containing up to 40 wt. %, based on said chemically modified gelatin gelling agent, of non-gelling extender.

7. A gel according to claim 6 containing about 20 wt. % of said polysaccharide gelling agent, based on the total weight of said gelling agents plus extender.

8. A gelable mixture suitable for forming an acidic dessert gel in which the gel-forming ingredients consist essentially of a polysaccharide gelling agent and a gelatin gelling agent in which the amino groups of said gelatin have been modified by chemical reaction to reduce its isoelectric point and an effective amount of a fruit acid.

9. A mixture according to claim 8 in which said gelatin gelling agent is an acylated gelatin.

10. A mixture according to claim 8 wherein said gelatin gelling agent has its isoelectric point at a pH of 4 or less.

11. A mixture according to claim 9 containing a polybasic organic fruit acid.

12. A mixture according to claim 8 containing a non-gelling extender.

13. A mixture according to claim 12 in which said extender is selected from the group consisting of starch hydrolysate and protein hydrolysate.

14. A mixture according to claim 9 wherein the polysaccharide gelling agent is selected from the group consisting of carragheenins, furcellarans, Danish agar, alginate esters, and pectins.

15. A method of forming an acidic dessert gel which comprises forming an aqueous gelling composition comprising water and a mixture according to claim 8 mixed in proportions effective to form a gel and allowing or causing the composition to gel.

* * * * *